Feb. 5, 1963
F. G. GRISÉ
3,076,638
PORTABLE CULINARY ELECTRIC MIXING AND
BEATING APPLIANCES
Filed Oct. 12, 1960
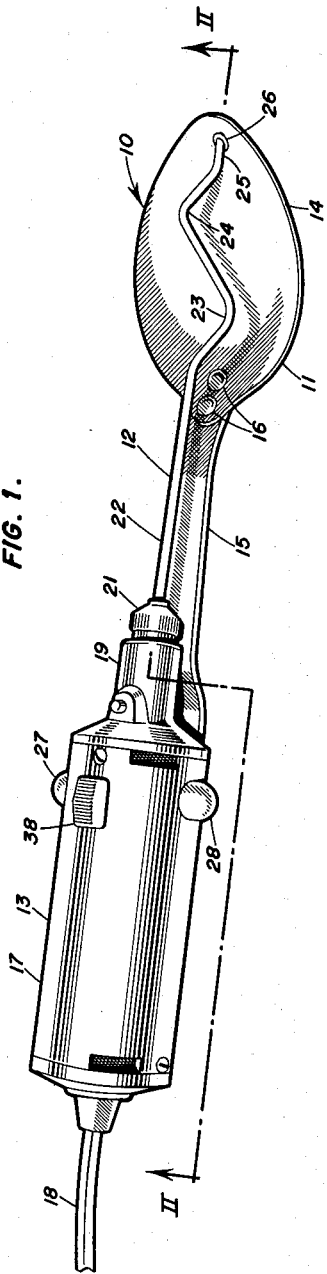
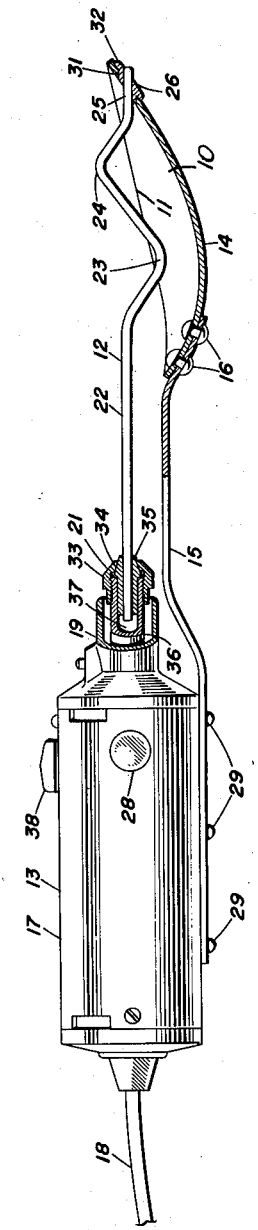
INVENTOR
FREDERICK G. GRISÉ
BY *Norman S. Blodgett*
ATTORNEY

United States Patent Office 3,076,638
Patented Feb. 5, 1963

3,076,638
PORTABLE CULINARY ELECTRIC MIXING AND
BEATING APPLIANCES
Frederick G. Grisé, New Braintree, Mass., assignor, by mesne assignments, to Electric Spoon, Inc., West Brookfield, Mass., a corporation of Massachusetts
Filed Oct. 12, 1960, Ser. No. 62,222
11 Claims. (Cl. 259—144)

This invention relates to improvements in culinary electric mixing and beating appliances of the so-called portable type. In such portable appliances, a small driving motor for rapid actuation of an attached axially elongated mixing and beating member, provides or serves itself as an easily-grasped handle for the appliance. This enables the user, with one hand, to apply the powered mixing member to selected portions of wet and/or dry food ingredients contained in a bowl or other culinary vessel, whilst said vessel, as grasped and held by the user's other hand, is itself being suitably manipulated to produce and maintain optimum conditions of depth and distribution for the contained food ingredients which are being mixed and/or being beaten by the portable appliance.

But in spite of their mobility, these hand-held electric mixers or beaters, as heretofore constructed, have never been able to cope with various-sized portions of partly mixed or beaten ingredients which, by their adhesiveness, or from spatter by the mixing member, will always in every food mixing or beating operation, cling or stick tenaciously to the side walls of the food-containing vessel or bowl. Obviously, the high speed mixing member itself cannot safely be used to dislodge these displaced ingredients from the vessel's walls, because of the dangers of bowl breakage, and/or of appliance damage, that are involved in any such manipulation. Thus it is that the user's only recourse, in these frequently-arising situations, is to switch off the driving motor and to set the appliance aside, in order to free his hand for pick-up and use of a kitchen spoon or similar extraneous implement, to scrape such clinging ingredients from the vessel's side walls, and to stir them back into the main body or mass of other partly-mixed or beaten food ingredients within said vessel.

A primary object of my invention is to eliminate all need for these frequently repeated time-consuming interruptions, that have heretofore been necessary and obligatory in all food mixing and/or beating operations performed by the usual portable (hand-held) electric mixing and beating appliances. This object is achieved, as hereinafter described in detail, by combining with such appliance's motorized elongated mixing or beating member a cooperating bowl scraping and food stirring implement (preferably a spoon), for which the appliance's drive motor also serves as a manipulating handle. By virtue of this arrangement, the so-organized appliance's user can perform with the appliance itself, without any interruption of or detriment to its motorized mixing or beating functions, all of the bowl scrapings and food stirrings which heretofore have had to be performed separately, by extraneous means, when using any of the hand-held electric mixing and beating appliances of the prior art.

Other and further objects and advantages of my invention will be apparent from the following detailed description thereof, taken in connection with the accompanying illustrative drawings, in which—

FIG. 1 is a topside perspective view of a portable culinary electric mixing and beating appliance which embodies my invention, and FIG. 2 is a side elevational view, partly in section, of said appliance, the section being taken along line II—II of FIG. 1, and showing the appliance's mixing and beating member turned approximately 90° from its FIG. 1 position.

Referring to said drawings, my improved appliance's driving motor, designated as a whole by the numeral 13, is here depicted as of the slender elongated "tool handle" construction which is shown and described by U.S. Dremel Patent No. 2,119,986, dated June 7, 1938. The motor parts are enclosed within an elongated cylindrical shell or casing 17, which serves, in conventional fashion, as a handle for the user's manipulation, within a mixing bowl or the like, of the appliance's motor-driven mixing member, designated as a whole by the numeral 12.

Electric current for the operation of motor 13 is supplied by a power cord 18 which enters the motor casing 17 at one end thereof. Said cord is conventionally connected through a stop-and-start switch 38, with the motor brushes (not shown) which are accessible, for adjustment purposes, through removable caps or covers 27 and 28, provided by the motor shell or casing 17.

The motor casing 17 at its other or forward end provides a hollow end cap 19, into which extends (see FIG. 2) the armature shaft 36 of the driving motor 13. The appliance's mixing and beating member 12 is connected to said armature shaft 36 in any suitable way; as here shown, for illustrative purposes only, the shaft 36 carries a chuck, designated as a whole by the numeral 21, which receives and grips the end of a long straight rearwardly extending portion 22 of the mixing and beating member 12, such that said portion 22 serves as a forward extension of the motor shaft. To accommodate said chuck 21, the end of armature shaft 36 is suitably recessed, as shown at 37 FIG. 2, to receive a set of chuck jaws 35, 35, whose ends present outer conical surfaces for cooperation with the conical bore 34 of a chuck sleeve 33. The latter surrounds and has screw-threaded engagement with the armature shaft 36, such that its rearward turning movement draws the jaws 35, 35 into tight clamping engagement with the rear end of portion 22.

The appliance's mixing and beating member 12 is here shown, merely for the sake of simplicity, as constituted by a length of stainless steel wire, of which the aforesaid long straight shaft-like portion 22, connected at 21 to the motor shaft 36, is an integral part. Forwardly of said shaft-like portion 22, the wire is formed or bent to provide a pair of oppositely-extending angular offsets or undulations 23 and 24, which provide the food-mixing and food-beating portion of this rapidly rotating member 12. Beyond these offsets or undulations 23 and 24, the wire terminates in a short straight portion 25, which is in axial alinement with long shaft-like portion 22, so as to serve in the forward journaling of the member 12, for the rapid rotative movement which is imparted thereto by the motor 13.

To obtain such journaling, this forward short end portion 25 of rotary member 12 is received in a bearing bushing 26, which is positioned at or near the tip or foremost part of a food stirring and scraping element, preferably (as herein shown) a spoon 10. Said spoon's tip has a suitable aperture 31 (see FIG. 2) which receives the bushing 26, the latter having an exterior flange 32 by which it is welded, brazed or otherwise secured to the material of the spoon 10. Said spoon's bowl 14 faces the rotary mixing and beating offsets 23 and 24, and is suitably spaced centrally (see FIG. 2) from the circular paths which said offsets described. These circular paths are also well spaced (see FIG. 1) from the curved edge 11 of spoon bowl 14. The spoon 10 is held in this position due to the attachment of its rear end, by rivets 16, 16 or the like, to a shank 15, the latter in turn being attached by rivets 29, 29 to the motor casing 17, such that the latter serves also as the manipulating handle for the so-positioned spoon 10.

This spoon 10, as an instantly-available manually operated bowl scraping and food stirring implement, plays an extremely important part in the successful and effective use of my above-described portable power-operated mixing and beating appliance. Even before the power is switched on, said spoon can be used with advantage, not only to measure into the vessel or bowl some or all of the dry or wet ingredients of a given recipe, but also, in a more or less preliminary fashion, to stir said ingredients together in said vessel or bowl, and to mash out any lumps that may form, the better to prepare and condition said ingredients for their ensuing power mixing and/or beating by the member 12.

But it is in conjunction with every such power mixing and/or beating operation that said spoon 10 is of most value to the user of the appliance. During the entire period of every mixing or beating operation, the spoon's manipulation by the user provides a stirring action on the ingredients that tends to centralize them in the mixing bowl or vessel, thus to insure greater uniformity in the mixing and/or beating of said ingredients by the adjacent rapidly turning offsets 23 and 24 of the member 12. Whenever, as frequently and inevitably happens in all power mixing and/or beating, some portion or portions of the ingredients adhere or cling to the mixing vessel's walls, the user can instantly, by the edges 11 of spoon 10, scrape off such displaced portion or portions of the ingredients, and return same, by spoon bowl 14, to the main body or mass of other partly mixed or beaten ingredients within said vessel. All such stirring and scraping manipulations of the spoon 10 are performed without interrupting or delaying, in any way, the progressive power mixing and/or beating action on the vessel's contents of the offsets 23 and 24 of member 12. Furthermore, in all such similar stirring and scraping manipulations of spoon 10, the latter serves as an effective guard or shield, to prevent the rapidly turning offsets 23 and 24 from striking or contacting the side walls and the bottom of the food-containing bowl or vessel.

I claim:

1. In a portable culinary electric mixing and beating appliance of the class wherein the driving motor for a food-contacting mixing or beating member provides or serves as a handle for moving said member about within a bowl or the like containing the food ingredients to be mixed or beaten, and wherein said member's peripheral portions are substantially exposed, such that portions of said ingredients are thrown or spattered outwardly, and adhere to the walls of said bowl, the combination with said motor driven member, of a juxtaposed implement, extending along one side only of the driven member's path and connected to the latter's said handle, for manipulation thereby, during mixing or beating operations of said driven member, to stir the bowl's contents, and to dislodge the portions of said contents that adhere to the walls of said bowl.

2. A portable culinary electric mixing and beating appliance as claimed in claim 1, in which the juxtaposed implement is of sufficient width to space its side edges appreciably from the path of said motor-driven mixing and beating member, such that said edges are always usable, during operation of said motor driven member, to scrape from the vessel's walls and into the path of said member any food ingredients adhering to said walls.

3. A portable culinary electric mixing and beating appliance, as claimed in claim 1, in which the juxtaposed implement is a spoon, whose bowl space contains a portion of the path of the motor driven member.

4. A portable culinary electric mixing and beating appliance as claimed in claim 3, in which the spoon is imperforate, such as to serve for the measurement of food ingredients added to the mix.

5. A portable culinary electric mixing and beating appliance as claimed in claim 3, in which the tip of said spoon's bowl provides a forward journal bearing for said motor driven mixing device.

6. A portable culinary electric mixing and beating appliance as claimed in claim 1, in which the bottom surface of said juxtaposed implement, without interference with or from said motor driven member, serves for the mashing of any lumps that form in the food ingredients within said bowl.

7. A portable culinary electric mixing and beating appliance as claimed in claim 3, in which the motor driven member extends lengthwise of the spoon, and moves in a path that is spaced from the spoon bowl's concave surface.

8. A portable culinary electric mixing appliance, comprising a spoon having a bowl and a shank, an elongated motor, the shank being attached to the motor so as to lie parallel to the axis of the motor shaft, a mixing member formed of a single length of wire connected to the motor shaft and extending generally axially thereof, the mixing member extending adjacent the bowl of the spoon, and having offsets extending laterally of its length, the offsets being adapted to move through the bowl when the motor is energized.

9. A portable culinary electric mixing appliance, comprising a spoon having a bowl and a shank, an elongated motor, the shank being attached to the motor so as to lie parallel to the axis of the motor shaft, a quick-acting chuck connected to the motor shaft and rotatable therewith, a mixing member formed of a single length of wire clamped in the chuck and extending generally axially of the motor shaft, the mixing member extending adjacent the bowl of the spoon, and having offsets extending laterally of its length, the offsets being adapted to move through the bowl when the motor is energized.

10. A portable culinary electric mixing appliance, comprising a spoon having a bowl and a shank, a bearing in the bowl at a portion thereof removed a substantial distance from the point of attachment of the shank thereto, an elongated motor, the shank being attached to the motor so as to lie parallel to the axis of the motor shaft, a mixing member formed of a single length of wire connected at one end to the motor shaft and extending generally axially thereof, the other end of the mixing member being journaled in the bearing in the bowl, the mixing member having offsets extending laterally of its length, offsets being adapted to move through the bowl when the motor is energized.

11. A portable culinary electric mixing appliance, comprising a spoon having a bowl and a shank, a bearing in the bowl at a portion thereof removed a substantial distance from the point of attachment of the shank thereto, an elongated motor, the shank being attached to the motor so as to lie parallel to the axis of the motor shaft, a quick-acting chuck connected to the motor shaft and rotatable therewith, a mixing member formed of a single length of wire clamped in the chuck at one end and extending generally axially of the motor shaft, the other end of the mixing member being journalled in the bearing in the bowl, the mixing member having offsets extending laterally of its length, the offsets being adapted to move through the bowl when the motor is energized.

References Cited in the file of this patent

UNITED STATES PATENTS

| | | |
|---|---|---|
| 929,917 | Collins | Aug. 3, 1909 |
| 2,260,654 | Barnett | Oct. 28, 1941 |
| 2,805,050 | Choppinet | Sept. 13, 1957 |